United States Patent [19]

Hall et al.

[11] Patent Number: 5,545,279

[45] Date of Patent: Aug. 13, 1996

[54] METHOD OF MAKING AN INSULATION ASSEMBLY

[76] Inventors: Herbert L. Hall, 1371 Pleasant Valley Rd.; James W. Scott, 1738 Stonewall Dr., both of Newark, Ohio 43055

[21] Appl. No.: 348,678

[22] Filed: Dec. 2, 1994

Related U.S. Application Data

[63] Continuation of Ser. No. 998,340, Dec. 30, 1992, abandoned.

[51] Int. Cl.[6] ............................ B32B 31/08; B32B 31/18
[52] U.S. Cl. ........................ 156/201; 156/62.2; 156/202; 156/213; 156/253; 156/269; 156/272.8
[58] Field of Search ................................ 156/62.2, 62.4, 156/200, 201, 202, 203, 213, 214, 216, 217, 253, 308.4, 461, 465, 466, 468, 269, 272.8; 428/74, 75, 76; 53/450, 550

[56] References Cited

U.S. PATENT DOCUMENTS

| | | | |
|---|---|---|---|
| 1,336,403 | 4/1920 | Weiss | 156/216 |
| 2,028,253 | 1/1936 | Spafford | 154/44 |
| 2,113,068 | 4/1938 | McLaughlin, Jr. | 154/44 |
| 2,206,058 | 7/1940 | Slayter et al. | 65/4.4 |
| 2,263,201 | 2/1941 | Wheeler et al. | 154/28 |
| 2,271,575 | 2/1942 | Waterman | 154/44 |
| 2,330,941 | 10/1943 | Acuff, Jr. | |
| 2,335,220 | 11/1943 | Edwards | 154/44 |
| 2,435,347 | 2/1948 | Gilman | 156/213 |
| 2,495,636 | 1/1950 | Hoeltzel et al. | |
| 2,579,036 | 12/1951 | Edelman | |
| 2,599,625 | 6/1952 | Gilman | 156/461 |
| 2,749,262 | 6/1956 | Wiser | 154/45 |
| 2,913,104 | 11/1959 | Parker | 206/60 |

(List continued on next page.)

FOREIGN PATENT DOCUMENTS

| | | | |
|---|---|---|---|
| 5508 | of 1972 | Japan . | |
| 51473 | 12/1972 | Japan | 156/213 |
| 21515 | 2/1974 | Japan . | |
| 51-14979 | 2/1976 | Japan . | |
| 143156 | of 1978 | Japan . | |
| 73708 | of 1978 | Japan . | |
| 84657 | 6/1979 | Japan . | |
| 54-42730 | 12/1979 | Japan . | |
| 51382 | of 1980 | Japan . | |
| 57-23583 | 5/1982 | Japan . | |
| 2104448 | 3/1983 | United Kingdom | 156/216 |

OTHER PUBLICATIONS

"Attic Seal—Protects The Thermal Efficiency of Fiber Insulation", Brochure, pp. 1–4 (No date).

"Performance Report #1–88", Performance Seal, Inc., Dallas TX (No date).

"Attic Seal—'Convection Barrier for Attic Insulation", Energy Design Update, Jun., 1988, pp. 10–13.

"Membranes Improve Insulation Efficiency", by Christopher A. Bullock, For the Third Annual Symposium On Improving Building Energy Efficiency In Hot and Humit Climates, Nov. 18–19, 1986, Arlington, TX.

(List continued on next page.)

*Primary Examiner*—Steven D. Maki
*Attorney, Agent, or Firm*—C. Michael Gegenheimer; Ted C. Gillespie

[57] ABSTRACT

A method for making a mineral fiber insulation assembly is disclosed. The insulation assembly includes a mineral core having opposed major surfaces, opposed side surfaces and opposed end surfaces. polymer film covers only the opposed major surfaces and opposed side surfaces. One or multiple lanes of mineral fiber packs are moved along a predetermined path. At least one sheet of polymer film is supplied to the predetermined path to cover the major surfaces and side surfaces. The polymer film is attached to at least one of the core side surfaces and a plurality of openings are in the polymer film adjacent at least one side surface. The mineral fiber pack and the polymer film cover are cut perpendicular to the predetermined path to form individual ones of the mineral fiber insulation assemblies.

8 Claims, 6 Drawing Sheets

U.S. PATENT DOCUMENTS

| | | | |
|---|---|---|---|
| 3,144,376 | 8/1964 | Plumberg et al. | 156/62.4 |
| 3,202,561 | 8/1965 | Swanson et al. | 156/216 |
| 3,264,165 | 8/1966 | Stickel | 161/43 |
| 3,318,063 | 5/1967 | Stone et al. | 52/404 |
| 3,331,669 | 7/1967 | Sinclair | 65/4.4 |
| 3,367,818 | 2/1968 | Voelker | 156/216 |
| 3,729,879 | 5/1973 | Franklin | 52/406 |
| 3,902,938 | 9/1975 | Eller et al. | 156/201 |
| 4,172,345 | 10/1979 | Alderman | 52/406 |
| 4,172,915 | 10/1979 | Sheptak et al. | 52/406 |
| 4,185,443 | 1/1980 | Budzyn | 53/550 |
| 4,214,418 | 7/1980 | Smith | 52/406 |
| 4,219,988 | 9/1980 | Shanklin et al. | 53/550 |
| 4,233,791 | 11/1980 | Kuhl et al. | 52/404 |
| 4,395,455 | 7/1983 | Frankosky | 428/299 |
| 4,401,503 | 8/1983 | Hertel | 156/201 |
| 4,569,174 | 2/1986 | Bossany | 52/406 |
| 4,590,714 | 5/1986 | Walker | 52/406 |
| 4,637,947 | 1/1987 | Maekawa et al. | 428/68 |
| 4,675,225 | 6/1987 | Cutler | 428/74 |
| 4,696,138 | 9/1987 | Bullock | 52/7 |
| 4,705,717 | 11/1987 | Cain et al. | 428/252 |
| 4,707,960 | 11/1987 | Bullock | 52/404 |
| 4,709,523 | 12/1987 | Broderick et al. | 52/406 |
| 4,726,985 | 2/1988 | Fay et al. | 428/228 |
| 4,751,134 | 6/1988 | Chenoweth et al. | 428/284 |
| 4,847,127 | 7/1989 | Stahl et al. | 428/61 |
| 4,927,705 | 5/1990 | Syme et al. | 428/282 |
| 4,952,441 | 8/1990 | Bose et al. | 52/404 |
| 5,236,754 | 8/1993 | McBride et al. | 428/74 |
| 5,240,527 | 8/1993 | Lostak et al. | 156/62.4 |
| 5,246,514 | 9/1993 | Alderman et al. | 156/324 |
| 5,277,955 | 1/1994 | Schelhorn et al. | 428/74 |
| 5,318,644 | 6/1994 | McBride et al. | 156/62.2 |
| 5,362,539 | 11/1994 | Hall et al. | 428/74 |

OTHER PUBLICATIONS

"Natural Convection in Enclosed Porous Media With Rectangular Boundaries" by B. K. C. Chan et al., Journal of Heat Transfer, Feb. 1970, pp. 21–27.

"Thermal Performance of the Exterior Envelopes of Buildings II", Proceedings of the ASHRAE/DOE Conference, Dec. 6–9, 1982.

"Thermal Performance of Residential Attic Insulation" by Kenneth E. Wilkes et al., Energy and Buildings 5 (1983) pp. 263–277.

"Fiberglas Building Insulation In Residential Construction" Owens–Corning Fiberglas Corp. brochure, Fiberglas Standards A8.2.1.

"Criterion for the appearance of natural convection in an anisotropic porous layer" by J. F. Epherre, International Chemical Engineering (vol. 17, No.4) Oct. 1977, pp. 615–616.

"Thermo–Brite® Radiant Barrier", PARSEC Product Bulletin 200–1, Jun. 1984, PARSEC, Inc.

"Mydrothermal Convection in Saturated Porous Media", by M. A. Combarnous et al., Groupe d'Etude I.F.P.–I.M.F. sur les Milieux Pareux, Toulouse, France 1971, pp. 231–307.

"Natural Convection in Vertical Permeable Space", by Claes G. Bankvall, Warme– und Stoffubertragung 7 (1974) No. 1.

"The Properties And Processing Of 'TYVEK' Spunbonded Olefin", DuPont Technical Information Manual for TYVEK, 1978.

"Stop energy–robbing air infiltration in your buildings with barrier sheeting of TYVEK", DuPont brochure.

"Lessons From A Mock Attic", by Nancy Armistead, Popular Science, Dec. 1992.

"Thermal Performance of One Loose–Fill Fiberglas Attic Insulation", by Kenneth E. Wilkes, Insulation Materials; Testing and Applications, 2nd vol., ASTM, STP 1116.

"Evaluation of Attic Seal Products Applied To Loose–Fil Fiberglass Insulation In A Simulated Residential Attic – Phases I and II", By K. E. Wilkes et al., Oak Ridge National Laboratory, Letter Report ORNL/M–1644.

"R–19 Insulation Only", picture of product cover, Nov. 19, 1982, Owens–Corning Fiberglas Corp.

"Directions for Applying Building Insulation", brochure, Owens–Corning Fiberglas Corp.

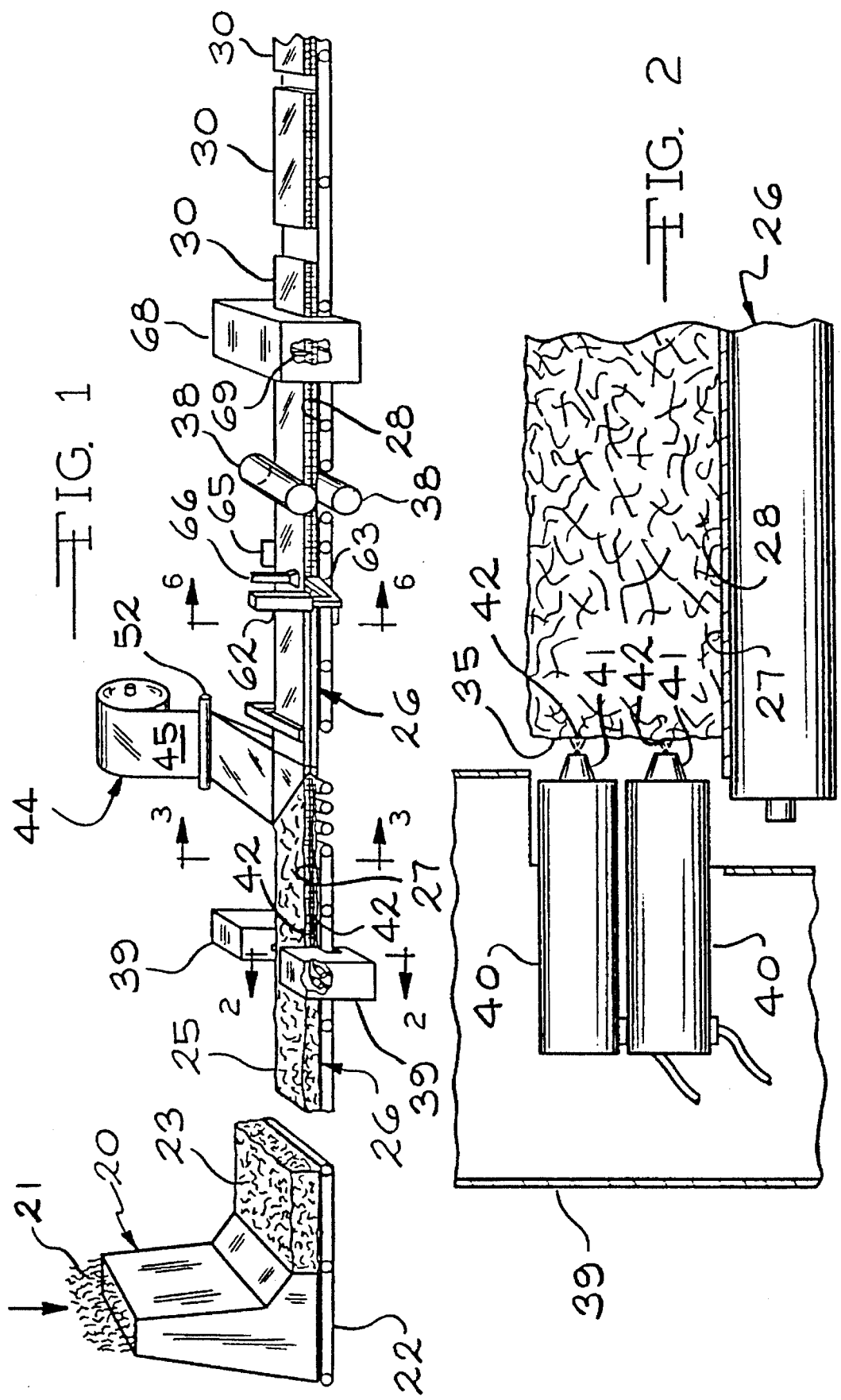

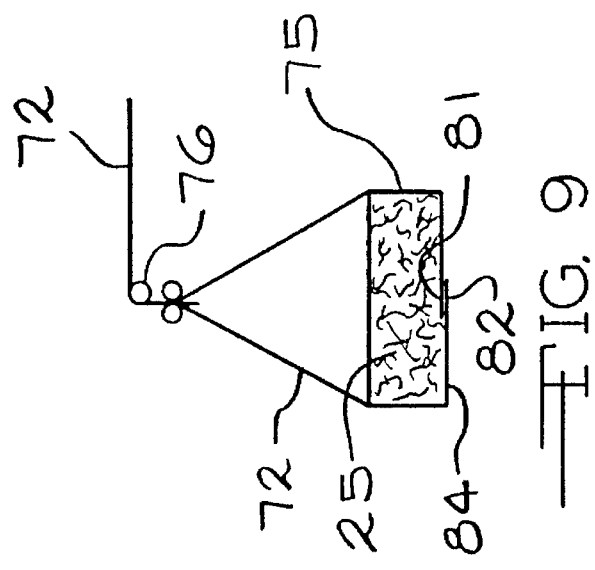
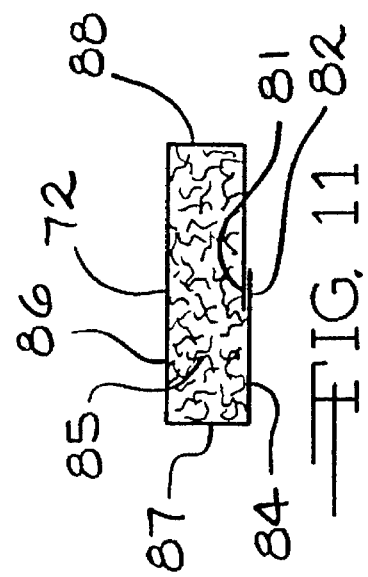
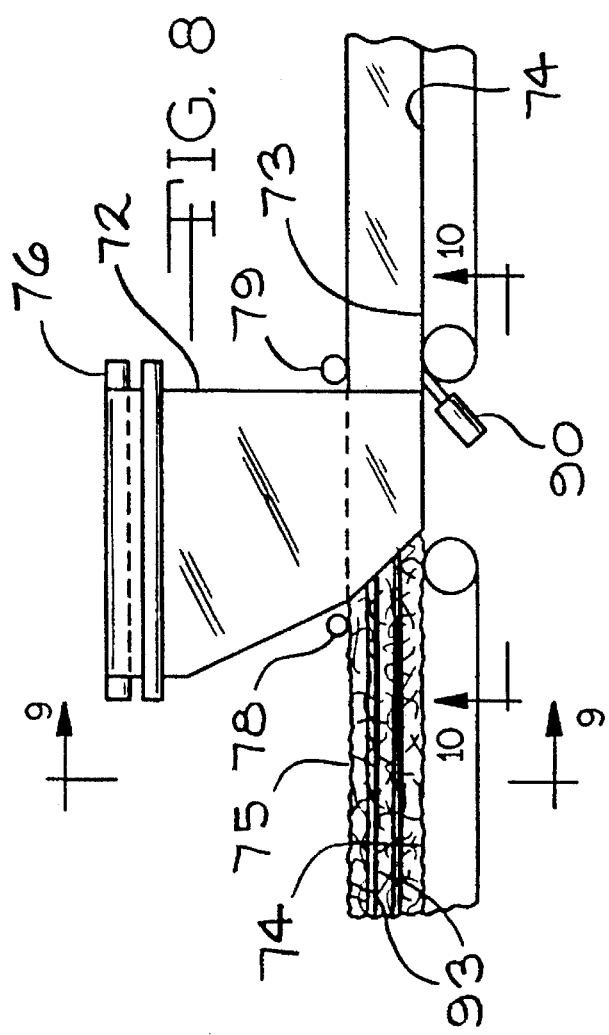
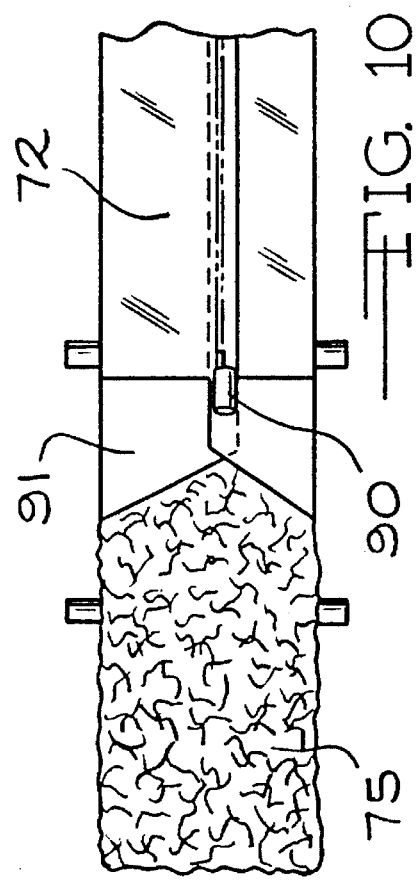

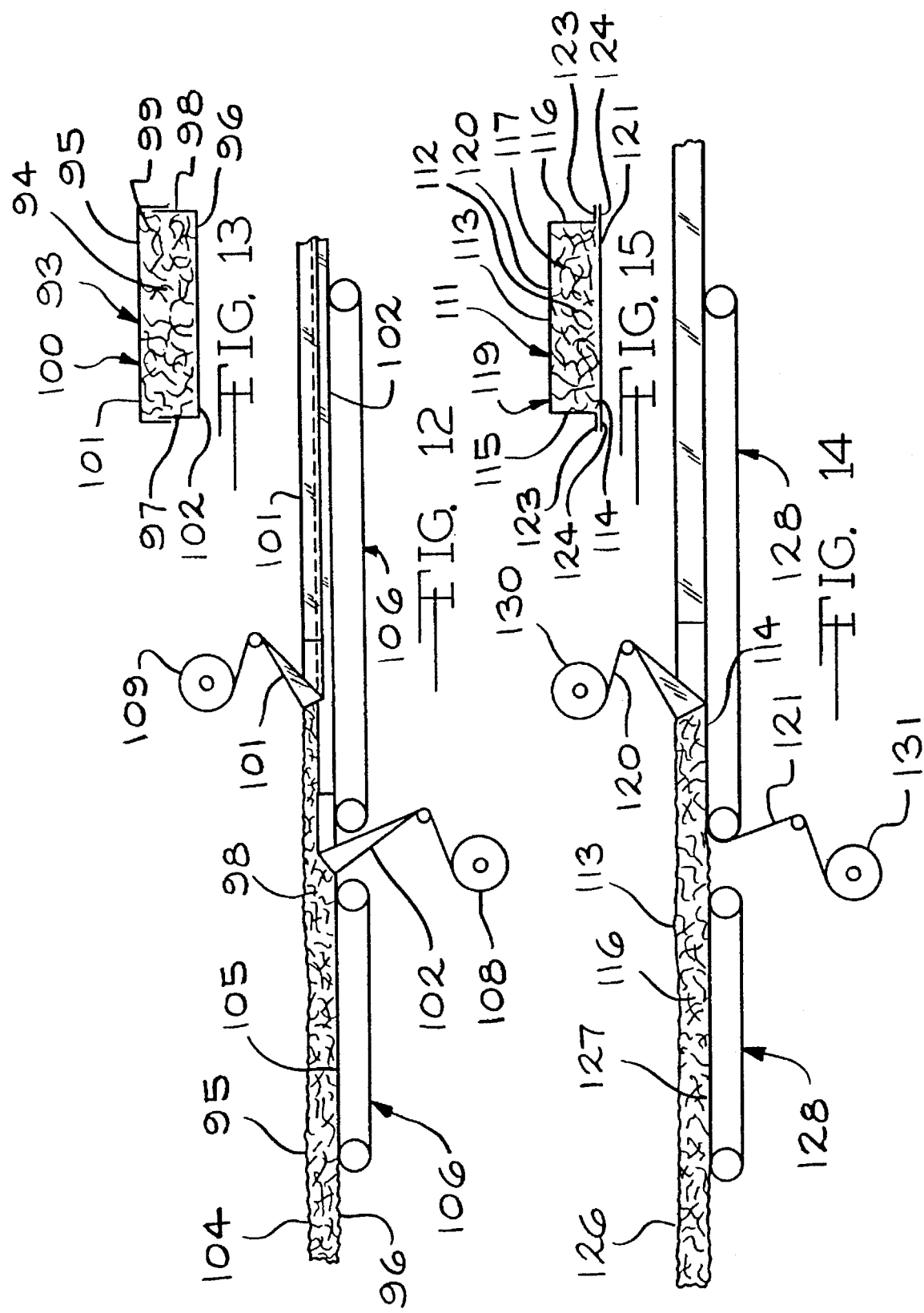

5,545,279

METHOD OF MAKING AN INSULATION ASSEMBLY

This application is a continuation of prior U.S. patent application Ser. No. 07/998,340 filed Dec. 30, 1992, now abandoned.

BACKGROUND OF THE INVENTION

This invention relates to a method of making a mineral fiber insulation assembly, The insulation assembly is used to insulate, for examples, floors, ceilings, attics and walls of buildings. Methods of making mineral fiber insulation assemblies are known in the art.

In the manufacturing of mineral fiber insulation assemblies, it is a commonly-used practice to fiberize the mineral fibers from molten mineral material and distribute the fibers on a collecting conveyor to form a pack. After formation, the pack is often slit longitudinally and positioned on conveyors. After processing, the pack is cut into desired lengths or batts. Often, the lengths of material are rolled or otherwise tightly compressed for packaging and transport. In some manufacturing processes, a facing material is added to the pack prior to the cutting step.

The present invention relates to an improved method of making a mineral fiber insulation assembly which covers a mineral fiber insulation pack on four surfaces only and which can operate at production speeds.

SUMMARY OF THE INVENTION

The present invention is directed to a method of making a mineral fiber insulation assembly having a mineral fiber core and an outer polymer film covering. The core has opposed major surfaces, opposed side surfaces and opposed end surfaces.

The method includes the steps of moving a mineral fiber pack along a predetermined longitudinal path. At least one continuous sheet of polymer film is supplied along the predetermined path. The opposed major surfaces and the side surfaces of the core are covered with the polymer film and the film is attached to at least one of the side surfaces of the core. A plurality of holes are provided in the polymer film adjacent at least one of the side surfaces. Finally, the assembled pack and the attached polymer film are cut in a direction generally perpendicular to the predetermined path to form individual ones of the mineral fiber insulation assemblies.

DESCRIPTION OF THE DRAWINGS

FIG. 1 is a diagrammatic elevational view showing the method and apparatus for making a mineral fiber insulation assembly, according to the present invention, with portions of the apparatus broken away;

FIG. 2 is a fragmentary, sectional view taken along the line 2—2 of FIG. 1 and shown on an enlarged scale;

FIG. 8 is a fragmentary elevational view showing another embodiment of method and apparatus, according to the present invention;

FIG. 9 is an end view taken along the line 9—9 of FIG. 8;

FIG. 10 is a bottom view taken along the line 10—10 of FIG. 8;

FIG. 11 is a view similar to FIG. 6 showing another embodiment of an insulation assembly, produced using the method and apparatus shown in FIGS. 8–10;

FIG. 12 is a fragmentary elevational view showing another embodiment of method and apparatus according to the present invention;

FIG. 13 is a view similar to FIG. 6 showing an insulation assembly constructed using the method and apparatus of FIG. 12;

FIG. 14 is a fragmentary side elevational view showing still another embodiment of method and apparatus according to the present invention; and FIG. 15 is a view similar to FIG. 6 showing an insulation assembly constructed using the method and apparatus of FIG. 14.

DESCRIPTION OF THE PREFERRED EMBODIMENTS

Figure 3:
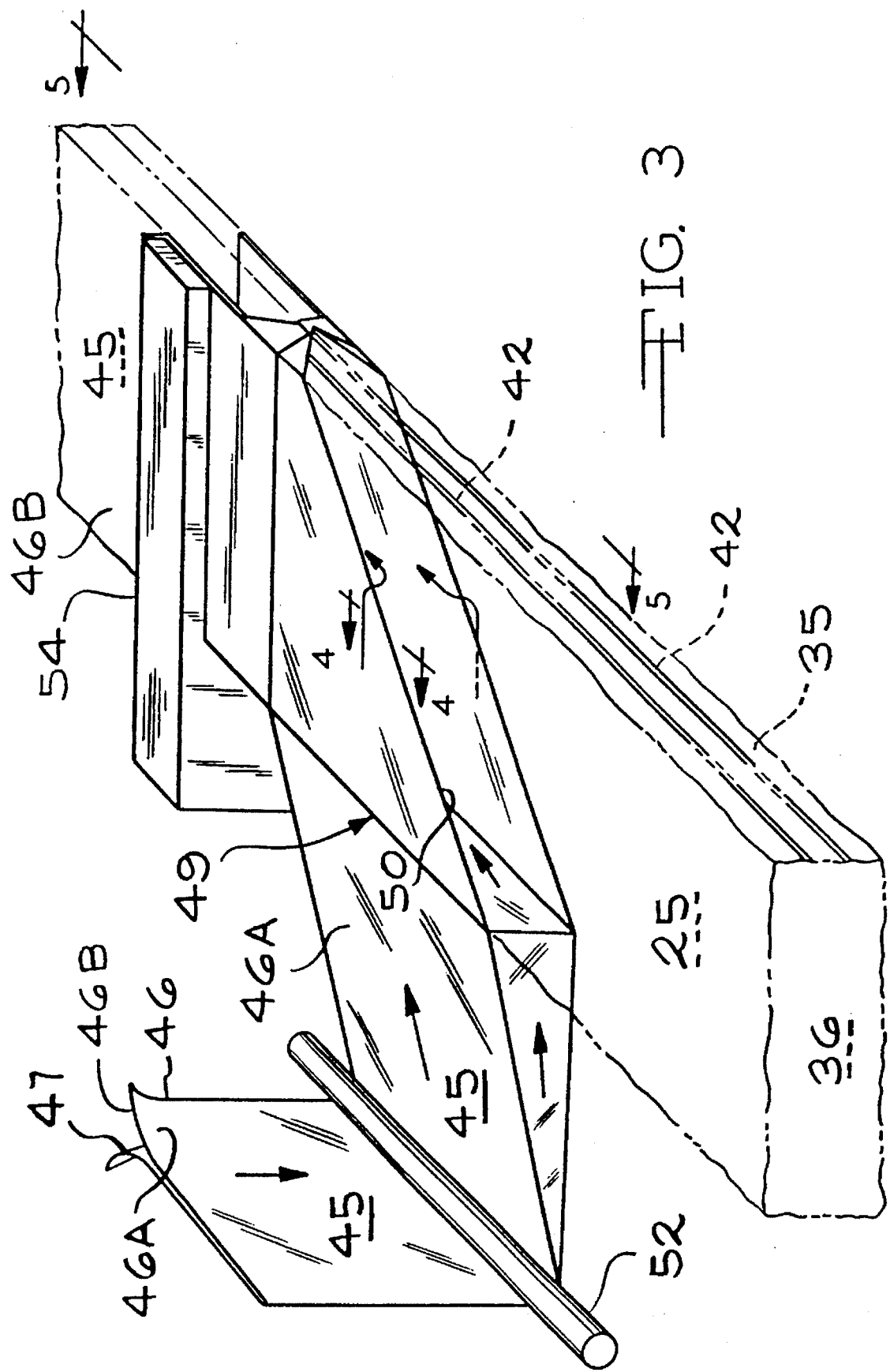
FIG. 3 is a fragmentary, perspective view taken along the line 3—3 of FIG. 1.

Referring to FIG. 1, a mineral fiber forming hood 20 is shown. Mineral fibers 21, such as rock wool fibers or glass fibers, move downwardly onto an initial conveyor 22, to form an initial pack 23.

Normally, in an operation which is not illustrated, the initial pack is formed into the dimensions desired by forming rollers and then are slit longitudinally to form, for example, the desired mineral fiber pack 25.

Figure 6:
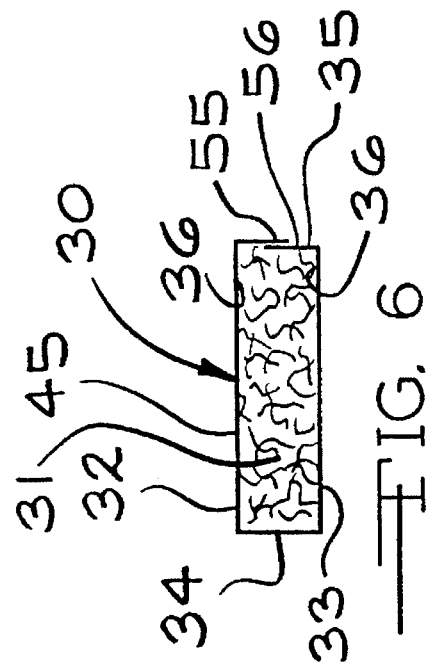
FIG. 6 is a diagrammatic view, showing one embodiment of an insulation assembly produced by the method, according to the present invention.

If the mineral fiber pack 25 is a fibrous glass pack, the glass fibers preferably have a mean length weighted fiber diameter less than 0.00034 inch (8.64 E-6 meters). The glass fibers preferably have a mean weighted fiber diameter between 0.00010 inch (2.54 E-6 meters) and 0.00024 inch (6.10 E-6 meters). The mineral fiber pack 25, according to the present invention, has a unrestrained or recovered thickness of at least 4 inches (10.16 cm.) and preferably between 4 (10.16 cm.) and 10 inches (25.4 cm.). A conveyor system 26 includes an upper surface 27 which defines a longitudinally extending predetermined path 28. Referring to FIG. 6, the apparatus shown in FIG. 1 is utilized to make a mineral fiber insulation assembly 30 having a mineral fiber core 31. The core 31 has opposed major surfaces 32 and 33; opposed side surfaces 34 and 35; and opposed end surfaces 36.

Referring to FIG. 1, optional pull rolls 38 move the mineral fiber pack 25 along the predetermined path 28 defined by the upper surface 27 of the conveyor system 26. In other embodiments, the movement of the conveyor system 26 is sufficient to move the mineral fiber pack 25.

In the present embodiment, adhesive applicators 39 are positioned on opposed sides of the mineral fiber pack 25. Referring to FIG. 2, each of the adhesive applicators 39 includes a pair of adhesive heads 40 having discharge nozzles 41 adjacent the side surfaces 34 and 35 of the mineral fiber pack 25. Referring to FIGS. 1–3, the nozzles 41 of the applicators 39 apply one or two ribbons or layers 42 of adhesive on the side surface 35 of the mineral fiber pack 25. In other embodiments the polymer film can be attached by thermal bonding to the mineral fiber pack, such as by heat sealing, rather than by the use of adhesive.

Figure 4:
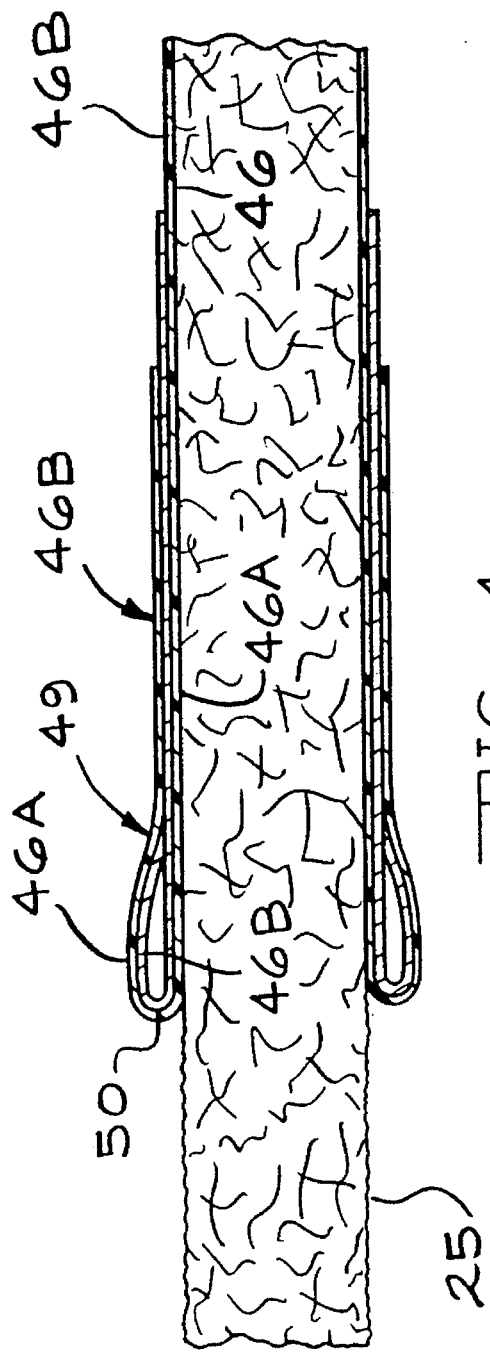
FIG. 4 is a fragmentary sectional view taken along the line 4—4 of FIG. 3 and shown on an enlarged scale.
Figure 5:
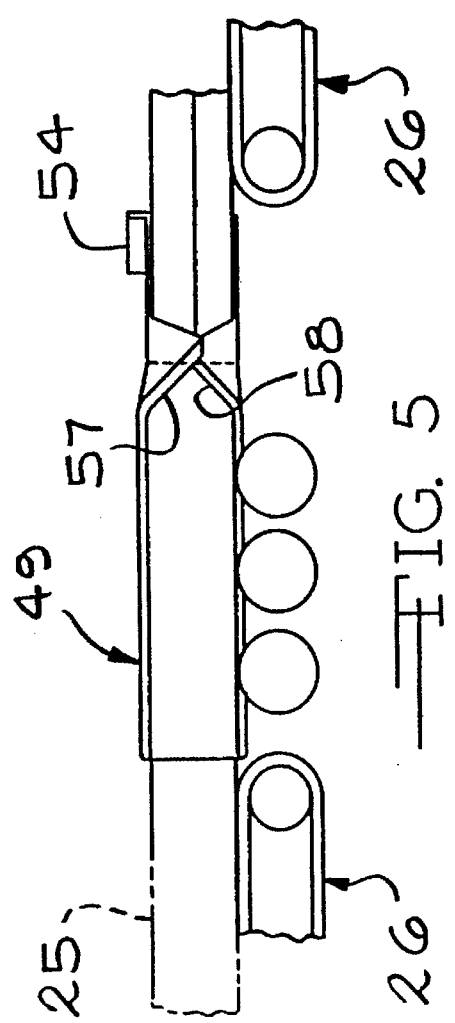
FIG. 5 is a fragmentary elevational view taken along the line 5—5 of FIG. 3.

A dispenser assembly 44 is positioned above the conveyor system 26 and mounts a roll of polymer film 45. Referring to FIG. 3, the polymer film 45 is folded in a centerfold or "C" fold. The centerfold or C-fold of the polymer film 45 includes a first leg 46 which is integrally connected to a second leg 47. Referring to FIGS. 3, 4 and 5, a metal reversing shoe 49 having an entrance throat 50 is mounted adjacent the predetermined path 28. The metal reversing shoe 49 is stationary and the moving mineral fiber pack 25 is received by the entrance throat 50 and travels through the reversing shoe 49. As shown in FIG. 3, the leg 46 of the C-folded polymer film 45 has a first surface 46A and a second surface 46B. Movement of the mineral fiber pack 25 and the optional pull rolls 38 pull the polymer film 45 from the supply roll, around a turning roll 52 and through the reversing shoe 49.

In the present embodiment, very little gap is provided between the opposed side surfaces 34 and 35 and the sides of the shoe 49. In other embodiments a gap of between 0.25 inch (0.64 cm.) and 0.75 inch (1.91 cm.) is provided. As the polymer film 45 is pulled around the entrance throat 50 of the reversing shoe 49, the continuous sheet of polymer film 45 is inverted. The first and second legs 46 and 47 are inverted whereby, for example, the upper surface 46A of the first leg 46 becomes the lower surface and the lower surface 46B becomes the upper surface after the inverting is completed and the continuous sheet of C-folded polymer film is positioned adjacent the mineral fiber pack 25. In the present embodiment, the continuous sheet of polymer film 45 is fed from the dispenser assembly 45 in a direction generally perpendicular to the predetermined path 28. After passing through the reversing shoe 49 the sheet of polymer film 45 is parallel to the predetermined path 28.

Preferably, a guide arm assembly 54 is mounted downstream adjacent the reversing shoe 49 to hold the components in a correct position.

As the sheet of polymer film 45 passes through the shoe 49 it encapsulates or covers the longitudinally extending mineral fiber pack 25. In the present embodiment, the polymer film 45 has overlapping free edges 55 and 56 (see FIG. 6). As the assembly passes through the reversing shoe 49 (see FIG. 5), the shoe 49 includes inwardly directed lips 57 and 58 which turn and overlap the free edges 55 and 56 of the polymer film 45. In the present embodiment, the layers of adhesive 42 on the side surface 35 of the core 31 attach the polymer film 45 and its leading edges 55 and 56. In other embodiments, the polymer film 45 is also attached to the opposite side edge 34. However, the polymer film 45 is not attached to either the major surface 32 or the major surface 33 of the mineral fiber insulation assembly 30. The polymer film 45 is preferably a polyethylene film. However, other polymer films may also be utilized such as a polypropylene film. Normally, the polymer film 45 is less than or equal to 1.0 mil in thickness. Preferably, the polymer film 45 is less than or equal to 0.5 mil in thickness.

The polymer film is also preferably a moisture permeable film when used in certain applications.

One adhesive which is suitable for use for the layer or layers of adhesive 42 is a pressure sensitive adhesive, such as HM-2707 distributed by H. B. Fuller Company. The adhesive is normally applied at a rate of 0.2 grams per square foot. Other types of attaching or fastening means may also be utilized to attach one or both of the side surfaces 34 and 35 to the polymer film 45. One such method is to heat seal the polymer film 45 to the side surfaces 34 and 35.

Figure 7:
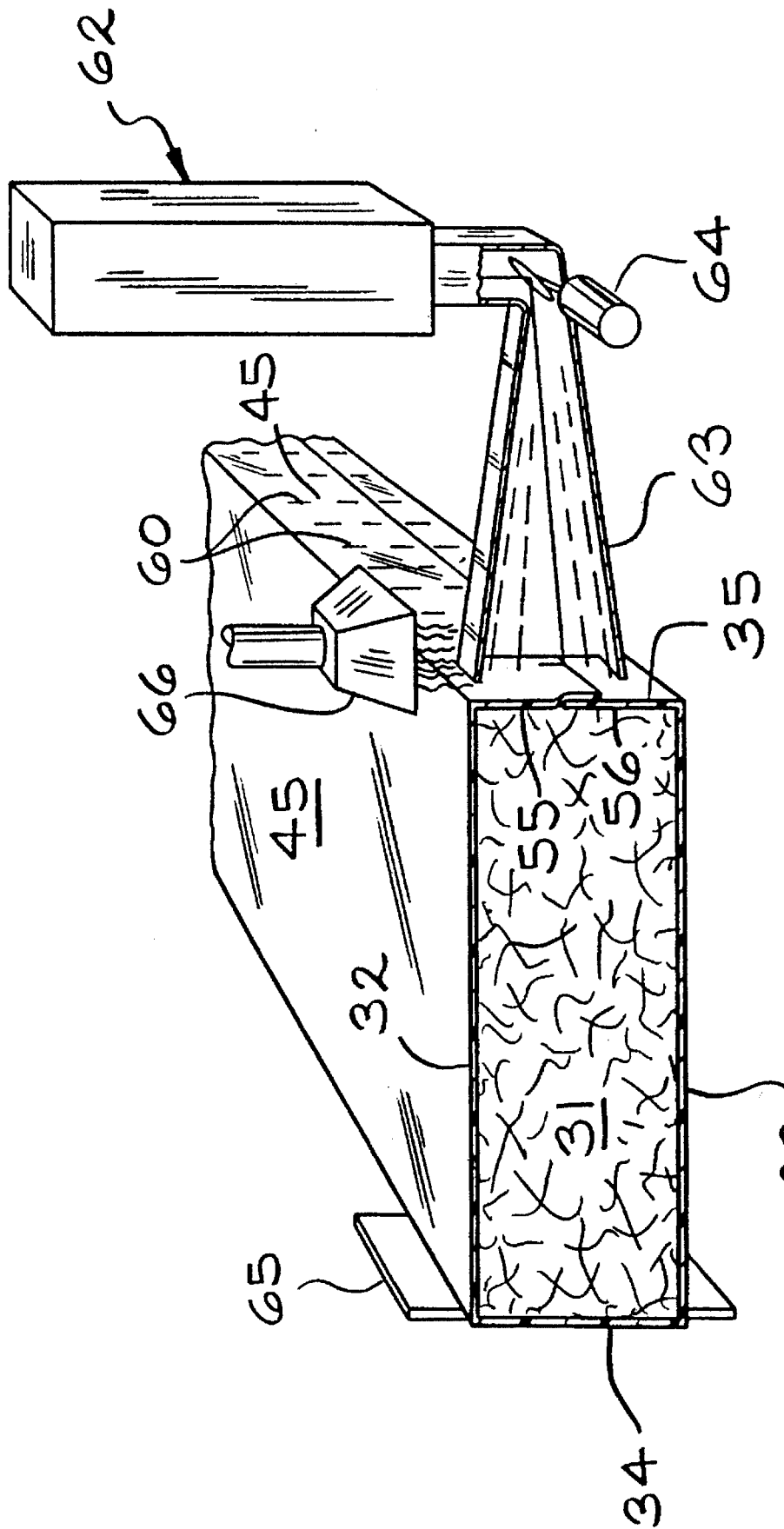
FIG. 7 is a fragmentary perspective view showing apparatus for forming openings in the polymer film.

The mineral fiber pack 25 which is now encapsulated or covered by the polymer film 45 continues to move along the predetermined path 28. Referring to FIG. 7, a plurality of openings 60 are formed in the polymer film 45 adjacent the side surface 35 of the core 31. In other embodiments, the openings 60 are placed or provided in the polymer film 45 prior to positioning adjacent the mineral fiber pack 25. In the present embodiment, the openings 60 comprise a plurality of vertical slits. However, many different shapes of openings 60 may be utilized. For example, it has been found that a preferable opening is a "C" shaped opening. The open end of the "C" being turned toward the downstream end of the moving mineral fiber pack 25. Other shapes of openings 60 may be, for example, triangular.

While in some embodiments gangs of rotating saws may be utilized to form the slit openings 60, in the present embodiment a laser assembly 62 is utilized. The laser assembly 62 is mounted adjacent the conveyor system 26. The laser assembly 62 includes a discharge end 63 positioned adjacent the side surface 35. A motor driven mirror assembly 64 directs the slitting laser beam through the discharge end 63 where it forms the slit openings 60. The laser assembly 62 also includes a laser stop plate 65 which is positioned in opposition to the discharge end 63 and a fume head 66 positioned over the discharge end 63.

After the openings 60 are cut in the polymer film 45, the assembly passes through the optional pull rolls 38 and through a chopper apparatus 68. Referring to FIG. 1, the chopper apparatus 68 includes a blade 69. The blade 69 is generally perpendicular to the predetermined path 28 and cuts or chopped the mineral fiber pack 25 into individual ones of the mineral fiber assemblies 30. In another embodiment water jets are utilized to cut the mineral fiber pack 25. Water jets tend to prevent lifting of the polymer film 45 adjacent the cut. The mineral fiber insulation assemblies 30 are then removed from the conveyor system 26 for compression and shipment.

Referring to FIGS. 8–11, another embodiment of the method of making a mineral fiber insulation assembly, according to the present invention, is shown. In this embodiment, a C-folded continuous sheet of polymer film 72 is moved downwardly toward a longitudinally extending predetermined path 73 which is defined by the upper surface of a conveyor system 74. A mineral fiber pack 75 is carried along the conveyor system 74. The C-folded continuous sheet of polymer film 72 is removed from a supply apparatus 76. A tuck roll 78 is positioned adjacent the pack 75 on one side of the C-folded polymer film 72 and a pull roll 79 is positioned on the other side. The C-folded sheet of polymer film 72 is inverted as it is positioned over the mineral fiber pack 75. The polymer film 72 passes through a shoe 91 and has free edges 81 and 82 which are positioned adjacent a lower major surface 84 of the mineral fiber pack 75. The mineral fiber pack 75 and its finished cut core 85 also include an upper opposed major surface 86, opposed side surfaces 87 and 88 and opposed ends 89. A heat seal seamer 90 joins the free edges 81 and 82 of the polymer film 72 together (see FIGS. 8 and 9) prior to exiting of the film 72 from the shoe 91.

The inverting shoe 91 inverts the film 72 after leaving the supply apparatus 76 as it is being applied to encapsulate or cover the opposed major surfaces 84 and 86 together with the opposed side surfaces 87 and 88 of the mineral fiber pack 75. Ribbons or layers of adhesive 93 are applied to the opposed side surfaces 87 and 88 prior to application of the polymer film 72.

FIGS. 12 and 13 illustrate another embodiment of the present invention. The method illustrated produces a mineral fiber insulation assembly 93. The assembly 93 includes a core 94, opposed major surfaces 95 and 96, opposed side surfaces 97 and 98 and opposed ends 99. A polymer film assembly 100, consisting of an upper sheet of polymer film 101 and an lower sheet of polymer film 102 covers the major surfaces 95 and 96 and the side surfaces 97 and 98.

The free edges of the upper film sheet 101 and lower film sheet 102 overlap and are adhered respectively to the side surfaces 97 and 98 of the mineral fiber core 94 and to each other.

Referring to FIG. 12, a mineral fiber pack 104 moves along a predetermined path 105 defined by the upper surface of a conveyor system 106. A supply roll 108 feeds a continuous sheet of the lower polymer film 102 toward the mineral fiber pack 104. The lower sheet of polymer film 102 covers a portion of the side surfaces 97 and 98 of the mineral fiber pack 104 and also covers the lower major surface 96. An upper supply roll 109 similarly dispenses the upper continuous sheet of polymer film 101 downwardly and positions it adjacent the mineral fiber pack 104 where it covers the upper major surface 95 and a portion of the side surfaces 97 and 98, as shown in FIG. 13.

The adhering steps to fasten the films 101 and 102 to the mineral fiber pack 104 and the opening forming steps and the chopping step to cut the individual mineral fiber insulation assemblies 93 to length are similar to the steps disclosed above with respect to the FIG. 1 embodiment.

Referring to FIGS. 14 and 15, still another embodiment of a method according to the present invention is illustrated. A mineral fiber insulation assembly 111 includes a core 112, opposed upper and lower major surfaces 113 and 114, opposed side surfaces 115 and 116 and end surfaces 117. A polymer film assembly 119 includes an upper continuous sheet of polymer film 120 and a lower continuous sheet of polymer film 121. The upper sheet of polymer film 120 covers the upper major surface 113 and the opposed side surfaces 115 and 116 of the core 112. The upper sheet of polymer film 120 includes horizontal flanges 123 at its free edges. The lower sheet of polymer film 121 covers the lower major surface 114 of the core 112 and includes outwardly extending mating edges 124 which mate with and are attached to the flanges 123 of the upper sheet of polymer film 120. In the final mineral fiber insulation assembly 111, the flanges 123 are attached to the mating edges 124 and comprise a stapling flange which may be utilized, for example, to fasten the insulation assembly 107 to vertical studs in a building.

Referring to FIG. 14, a mineral fiber pack 126 moves along a longitudinally extending predetermined path 127 which is defined by an upper surface of a conveyor system 128. An upper supply roll 130 dispenses the upper sheet of polymer film 120. The film 120 covers the upper major surface 113 and the opposed side surfaces 115 and 116 of the mineral fiber pack 126. The sheet of polymer film 120 is adhered or otherwise attached to the opposed side edges 115 and 116. A lower supply roll 131 dispenses the continuous lower sheet of polymer film 121. The sheet 121 is flat as it is positioned adjacent the lower major surface 114 and is adhered to that surface. At the same time, as shown in FIG. 15, the flanges 123 of the upper sheet of polymer film 120 and the mating edges 124 of the lower sheet of polymer film 121 are adhered or otherwise attached. The remaining steps including forming the openings and cutting the mineral fiber insulation assembly 111 to length are similar to those described above, with respect to the FIG. 1 embodiment.

Many changes and revisions may be made to the above described embodiments without departing from the scope of the present invention and from the following claims.

We claim:

1. A method for making mineral fiber insulation assemblies comprising:

moving a mineral fiber pack along a predetermined pathway, said mineral fiber pack having opposed major surfaces and opposed side surfaces, folding a continuous sheet of polymer film into a C fold having a first leg including a first edge and a second leg including a second edge, moving said continuous C folded polymer sheet in a direction generally perpendicular to said predetermined path, inverting said first and second legs of said continuous C folded polymer sheet, supplying said continuous C folded polymer sheet along said predetermined pathway wherein said mineral fiber pack is received between the inverted first and second legs of said continuous C folded polymer sheet, covering said opposed major surfaces and said opposed side surfaces of said mineral fiber pack with said continuous C folded polymer sheet, attaching said continuous C folded polymer sheet to said mineral fiber pack, providing a plurality of openings from the group consisting of vertically oriented slits, C shaped openings and triangular openings in said continuous C folded polymer sheet adjacent at least one of said side surfaces, and cutting said mineral fiber pack covered with said continuous C folded polymer sheet in a direction generally perpendicular to said predetermined pathway to form said insulation assemblies.

2. The method as claimed in claim 1 wherein said step of attaching comprises placing at least one layer of adhesive between said continuous C folded polymer sheet and said mineral fiber pack.

3. The method as claimed in claim 1 wherein said step of attaching comprising heat sealing said continuous C folded polymer sheet to said mineral fiber pack.

4. The method as claimed in claim 1 wherein said plurality of openings is formed by cutting.

5. The method as claimed in claim 4 wherein said cutting is accomplished with a laser beam.

6. The method as claimed in claim 1 further including the steps of overlapping said first edge of said first leg and said second edge of said second leg on one of said opposing side surfaces of said mineral fiber pack, and attaching said first edge to said second edge.

7. The method as claimed in claim 1 further including the steps of overlapping said first edge of said first leg and said second edge of said second leg on one of said opposing major surfaces of said mineral fiber pack, and attaching said first edge to said second edge.

8. The method as claimed in claim 1 wherein said continuous C folded polymer sheet comprises polyethylene.

* * * * *